(12) United States Patent
Erickson et al.

(10) Patent No.: US 7,001,115 B2
(45) Date of Patent: Feb. 21, 2006

(54) CUTTING INSERT AND TOOLHOLDER FOR HOLDING THE SAME

(75) Inventors: Robert A. Erickson, Raleigh, NC (US); William M. Alexander, IV, North Huntingdon, PA (US)

(73) Assignee: Kennametal Inc., Latrobe, PA (US)

( * ) Notice: Subject to any disclaimer, the term of this patent is extended or adjusted under 35 U.S.C. 154(b) by 24 days.

(21) Appl. No.: 10/623,897

(22) Filed: Jul. 21, 2003

(65) Prior Publication Data

US 2005/0019112 A1   Jan. 27, 2005

(51) Int. Cl.
 B23B 27/02 (2006.01)
(52) U.S. Cl. .................................... 407/113; 407/103
(58) Field of Classification Search ............. 407/113, 407/103, 104–112
See application file for complete search history.

(56) References Cited

U.S. PATENT DOCUMENTS

| 2,907,099 | A | | 10/1959 | Dow |
| 4,066,376 | A | | 1/1978 | Eckle et al. |
| 4,443,136 | A | | 4/1984 | Kemmer |
| 4,462,725 | A | | 7/1984 | Satran et al. |
| 5,779,400 | A | | 7/1998 | Fountaine |
| 5,816,753 | A | * | 10/1998 | Hall ........................... 408/224 |
| 6,152,658 | A | | 11/2000 | Satran et al. |
| 6,168,356 | B1 | | 1/2001 | Sjoo et al. |
| 6,244,789 | B1 | * | 6/2001 | Tsuda ......................... 407/107 |
| 6,257,807 | B1 | | 7/2001 | Heinloth |

FOREIGN PATENT DOCUMENTS

| CH | 664 102 A5 | 2/1988 |
| DE | 32 04 999 A1 | 8/1983 |
| GB | 1 462 755 | 1/1977 |

* cited by examiner

Primary Examiner—Willmon Fridie, Jr.
(74) Attorney, Agent, or Firm—Larry R. Meenan

(57) ABSTRACT

A cutting insert for metalworking operations has an insert core with a pair of cutting portions having cutting tips extending therefrom such that a toolholder having a pocket to accept such a core is suitable to accept different cutting inserts having a common core plus different cutting portions. As a result, for example, an 80° diamond, a 55° diamond and a 35° diamond cutting insert may all be utilized within a common toolholder. The invention is also directed to a toolholder that will accept such a variety of cutting inserts.

15 Claims, 9 Drawing Sheets

CUTTING INSERT AND TOOLHOLDER FOR HOLDING THE SAME

BACKGROUND OF THE INVENTION

1. Field of the Invention

The invention is directed to tooling for metalworking operations and, more particularly, directed to cutting inserts and the toolholder for holding such inserts during metalworking operations, such as turning.

2. Description of Related Art

In turning operations, one of the primary criteria for selecting an appropriate insert is the required nose angle. The nose angle is defined at the cutting point in a cutting portion of the insert made up of two straight lines meeting at that point. There are turning inserts referred to as 80° diamonds, 55° diamonds and 35° diamonds, whereby these numerical values define the angle the two sides form with the cutting point. Typically, these inserts are symmetric with two opposing cutting regions. These inserts may also be indexable.

In the past, each cutting insert having a different nose angle would require a dedicated toolholder having a pocket conforming to the shape of the unengaged cutting portion of that insert, thereby requiring a toolholder for every different insert shape.

U.S. Pat. No. 6,152,658 is directed to a modular cutting tool assembly whereby, as illustrated in FIG. 2, a plurality of different inserts may be accepted by the pocket of a single toolholder. However, the pocket of this toolholder is suitable to accept a variety of different inserts only because the pocket has been formed to accommodate each of the different shapes of these inserts. As a result, any one insert may not be supported optimally because portions of the toolholder pocket have been recessed and carved out to accommodate cutting inserts of other shapes.

Therefore, one object of the present invention is to provide a cutting insert having a standardized core with a desired cutting portion such that a variety of other cutting inserts having the same standardized core, but different cutting portions, may be utilized in a common toolholder, thereby minimizing the need to maintain in inventory a large number of different toolholders.

A further object is to provide a single toolholder that will accept these differently shaped inserts.

Additionally, during some metalworking operations, space is limited and the tip-to-tip length of a particular standard cutting insert used for tuning operations may be excessive. In particular, for small cutting tools, such as those cutting inserts having an IC (inscribed circle) of ¼ inch or less, space is limited and it is desired, if possible, to reduce the tip-to-tip length between cutting inserts while, at the same time, maintaining the strength and integrity of those inserts.

SUMMARY OF THE INVENTION

A cutting insert for metalworking operations is comprised of an insert body having a top surface and a bottom surface defining sides therebetween and a core having two pairs of core sides. Top edges are defined at the intersection of the top surface with the sides, and bottom edges are defined at the intersection of the bottom surface with the sides. Each pair of core sides has a first core side and a second core side, wherein the top edges of these core sides form a core angle with one another. When viewed in plan, the top edge of the first core side of one pair is parallel to the top edge of the first core side of the other pair and the top edge of the second core side of one pair is parallel to the top edge of the second core side of the other pair. A first cutting portion and a second cutting portion extend from the core. Each cutting portion is comprised of a pair of sides having top edges which converge at a tip angle to form a cutting tip and a bisector line bisecting the tip angle. When viewed in plan, the bisector line of the first cutting portion is offset from and parallel to the bisector line of the second cutting portion and the tip angle is less than the core angle.

Additionally, a toolholder for supporting a cutting insert has a core with four sides defining a quadrilateral shape and having diametrically opposing corners with a pair of cutting portions having cutting tips extending from two diametrically opposing corners. The toolholder is comprised of a body having a front end and a pocket with a floor and walls positioned rearwardly from the front end of the body, wherein the pocket has a core region adapted to conform to and provide support to the insert core. Two walls in the core region are adapted to conform to and provide support to two sides of the insert core and the floor in the core region is adapted to conform to and provide support to the insert core. The pocket further includes a recess extending rearwardly from the core region and of sufficient area to encompass one cutting tip of the insert when the insert is mounted within the pocket. The core region of the pocket terminates at the front end of the body such that when the insert is positioned within the pocket, one cutting tip extends beyond the front end of the toolholder while the other cutting tip is encompassed by the pocket recess.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
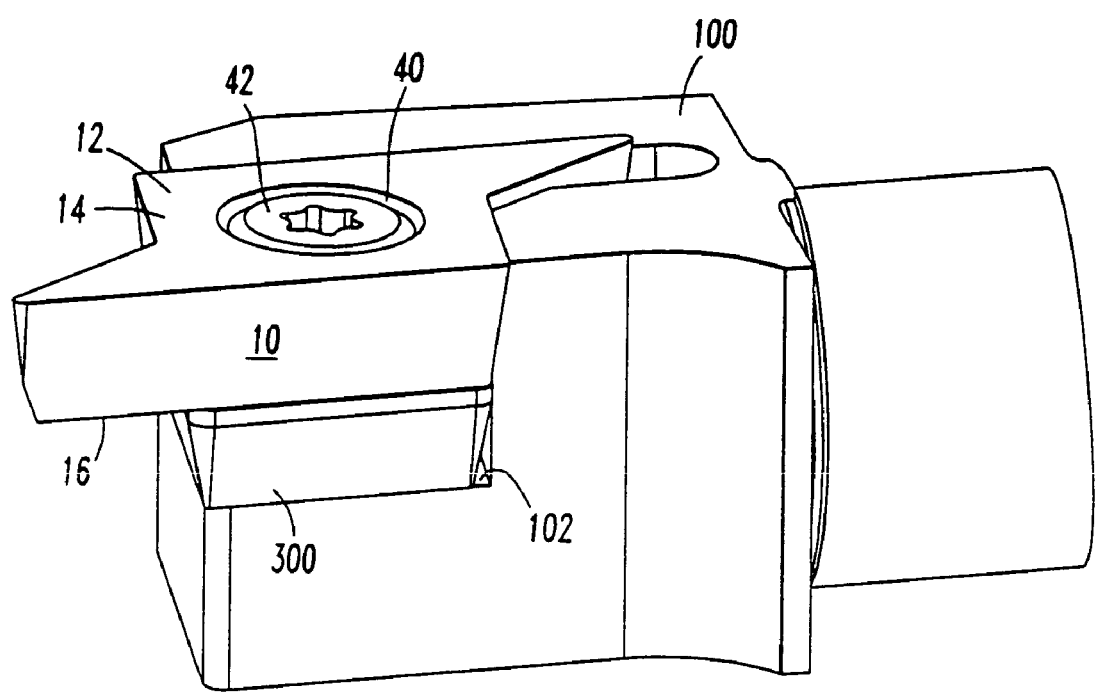
FIG. 1 is a perspective view of one cutting insert mounted within a toolholder in accordance with the subject invention.
Figure 2:
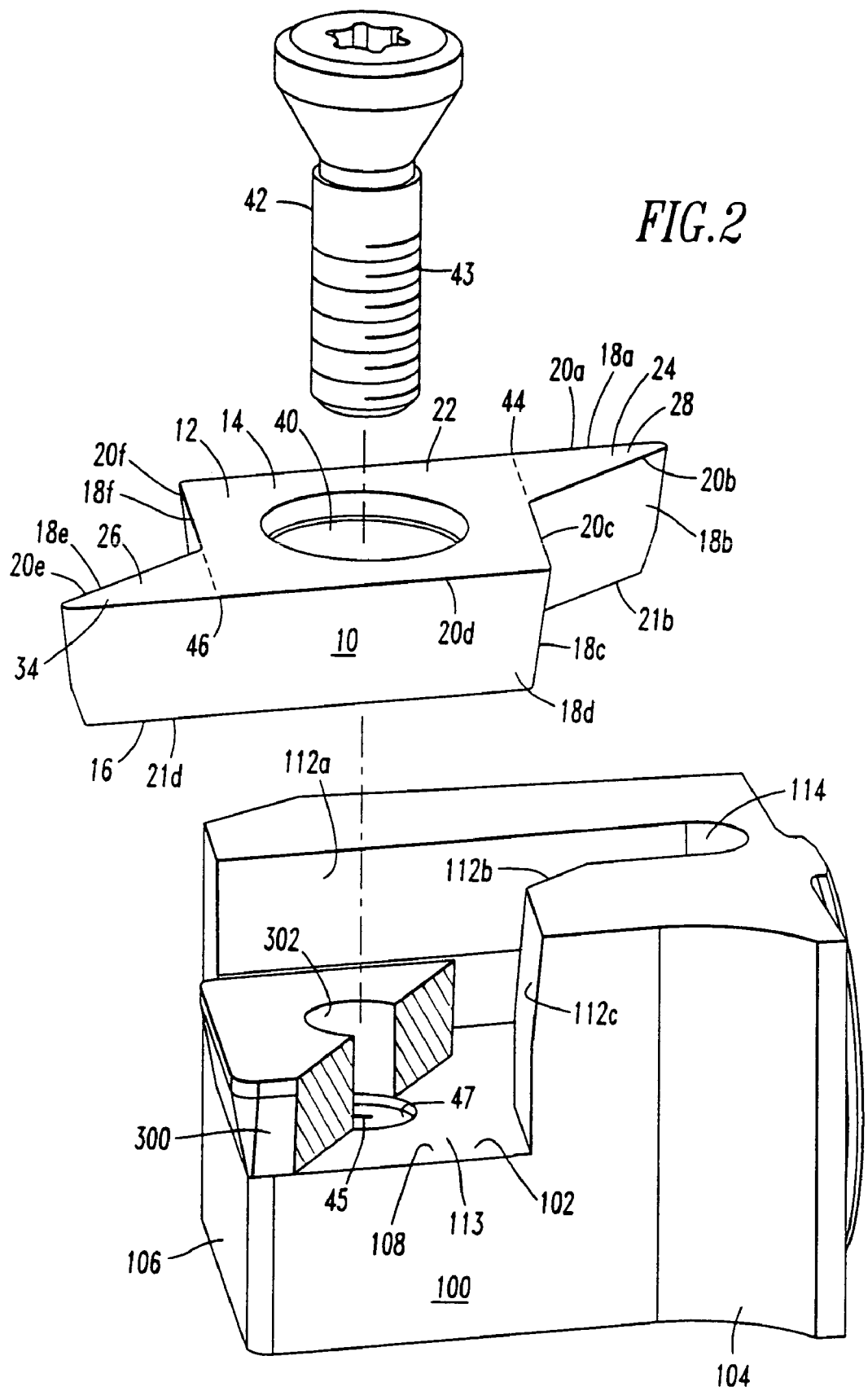
FIG. 2 is an exploded perspective view of the arrangement illustrated in FIG. 1.

FIG. 1 illustrates a perspective view of a cutting insert 10 mounted within a toolholder 100 in accordance with the subject invention. FIG. 2 illustrates an exploded view of these same elements and FIGS. 1 and 2 will be discussed simultaneously.

The unique shape of the cutting insert 10 makes possible the introduction into a common toolholder of mounting one of a plurality of similar cutting inserts which, as will be seen, have a common core, but different cutting portions.

Figure 3A:
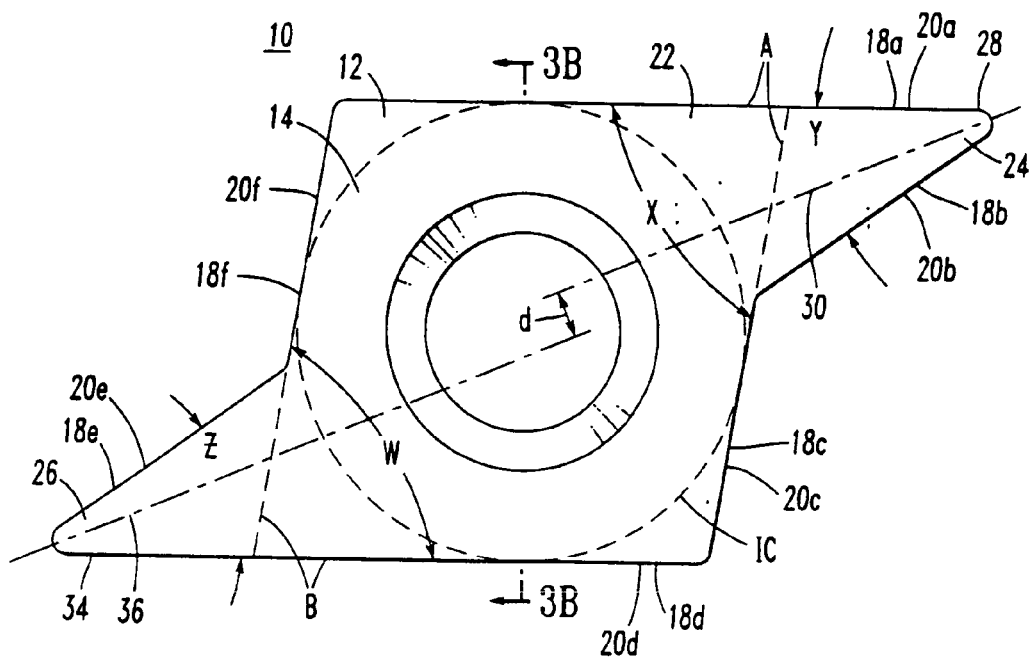
FIGS. 3A and 3B illustrate a top view, or plan view, and a section view along lines "3B—3B", respectively, of a 35° diamond cutting insert.
Figure 3B:
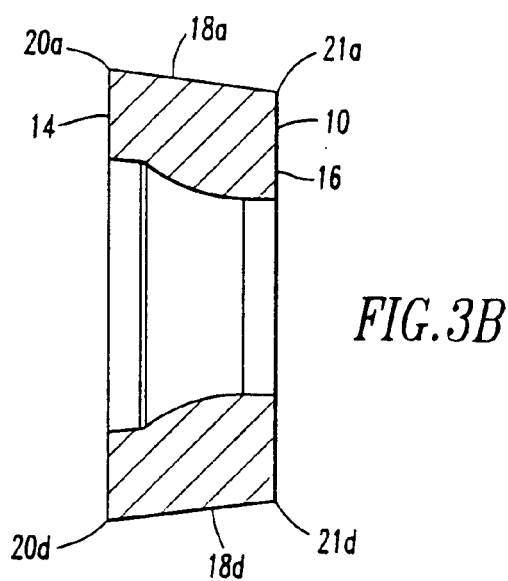

The cutting insert 10 is further illustrated in FIGS. 3A and 3B. The cutting insert 10 may be utilized for metalworking operations and has an insert body 12 with a top surface 14 and a bottom surface 16 defining sides 18a–18f therebetween, comprised of tip sides and core sides.

Top edges 20a–20f are defined at the intersection of the top surface 14 with the sides 18a–18f. Bottom edges are defined at the intersection of the bottom surface 16 with the sides 18a–18f. Bottom edges 21a and 21d are shown in FIG. 3B.

The insert core 22 is made up of two pairs A, B of core sides, wherein one pair A is defined by the intersection of a first core side 18a and an extension of the second core side 18c and another pair B has a first core side 18d and a second core side 18f. The top edges 20a, 20c and 20d, 20f of each pair A, B of core sides 18a, 18c and 18d, 18f form core angles, as illustrated by angles W and X in FIG. 3A.

When viewed in plan, which is looking at the insert directly down upon the top surface 14, the top edge 20a of the first core side 18a of one pair A is parallel to the top edge 20d of the first core side 18d of the other pair B. Furthermore, when viewed in plan, the top edge 20c of the second core side 18c of one pair A is parallel to the top edge 20f of the second core side 18f of the other pair B.

The cutting insert 10 has a first cutting portion 24 and a second cutting portion 26 each extending from the core 22.

Cutting portion 24 is comprised of a pair of sides 18a, 18b converging at a first tip angle Y to form a cutting tip 28. A bisector line 30 bisects the tip angle Y. The second cutting portion 26 has a pair of sides 18d, 18e whose top edges 20d, 20e converge at a second tip angle Z to form a cutting tip 34. A bisector line 36 bisects the second tip angle Z. The bisector line 30 of the first cutting portion 24 is offset by a distance d from and parallel to the bisector line 36 of the second cutting portion 26. Furthermore, each of the tip angles Y, Z is less than the respective core angles X, W adjacent to these tips 28, 34.

As illustrated in FIG. 3A, one side of the cutting tip 28 is common with the second core side 18a. Furthermore, as illustrated in FIG. 3A, the first tip angle Y is equal to the second tip angle Z. However, it should be noted that such a relationship is not necessary and it is entirely possible to have a first cutting portion 24 and a second cutting portion 26, each having different tip angles of between 5° and 85°. It should be noted that the cutting insert 10, illustrated in FIGS. 1–3, has a tip angle of 35°.

From inspection of the insert 10, illustrated in FIG. 2, it should be apparent that the cutting tip 34 of the insert 10 may be positioned to extend beyond the toolholder 100 for machining or the insert 10 may be indexed such that cutting tip 34 may be recessed within the toolholder 100.

As illustrated in FIGS. 1 and 2, the cutting insert 10 has a bore 40 extending between the top surface 14 and the bottom surface 16 to accept a retention pin 42 for retaining the insert 10 within a pocket 102 of the toolholder 100. The retention pin 42 may have threads 43 to interlock with mating threads 45 of a bore 47 within the toolholder pocket 102. In the alternative, although not illustrated in the figures, it is easily envisioned by one skilled in the art to provide the top surface 14 and bottom surface 16 of the body 12 with surfaces to accept a clamp for holding the insert 10 within the pocket 102 of the toolholder 100.

Throughout the remainder of this discussion, similar elements of the insert 10 illustrated in FIGS. 3A–3B are identified by the same reference numbers, but incremented by multiples of 100, i.e., insert 10 indicated as insert 110.

Figure 4A:
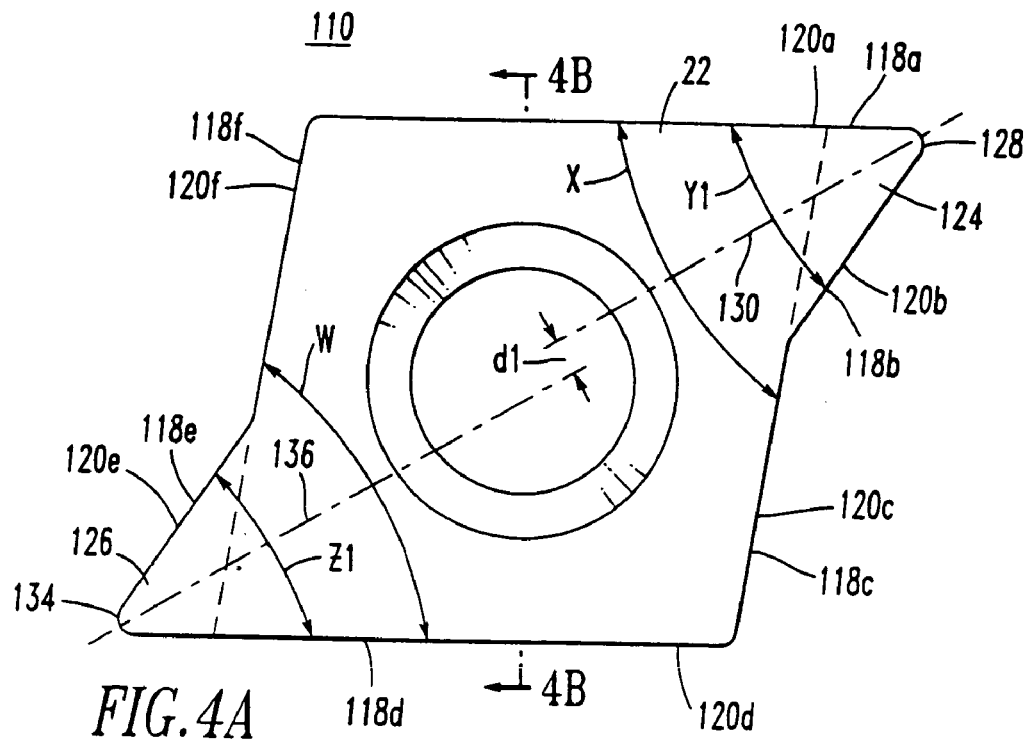
FIGS. 4A and 4B illustrate a top view, or plan view, and a section view along lines "4B—4B", respectively, of a 55° diamond cutting insert.
Figure 4B:
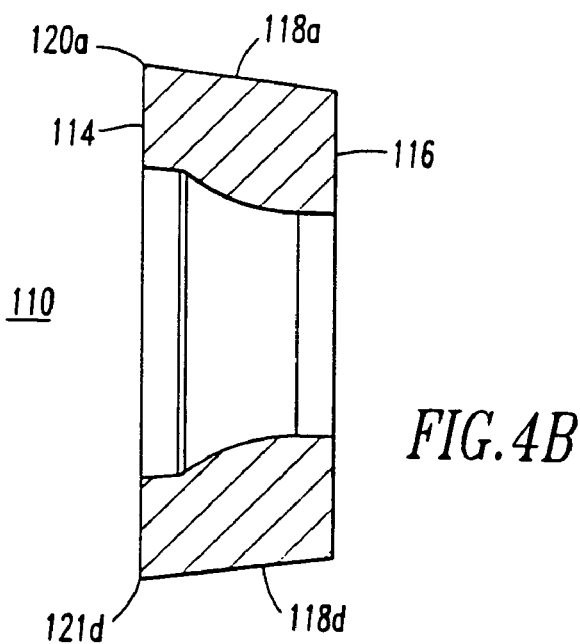

Directing attention to FIG. 4A, a cutting insert 110, typically referred to as a 55° diamond, has a core 22. The insert 110 has many features identical to that of cutting insert 10 illustrated in FIG. 3A. However, cutting insert 110 has a first cutting portion 124 comprised of a pair of sides 118a, 118b having top edges 120a, 120b that converge at a tip angle Y1 to form a cutting tip 128. A bisector line 130 bisects the tip angle Y1. A second cutting portion 126 is comprised of a pair of sides 118d, 118e having top edges 120d, 120e that converge at a tip angle Z1 to form a cutting tip 134. A bisector line 136 bisects the tip angle Z1. In a plan view, the bisector line 130 of the first cutting portion 124 is offset by an amount d1 from and parallel to the bisector line 136 of the second cutting portion 126. Furthermore, each tip angle Y1, Z1 is less than the respective core angle X, W.

Figure 5A:
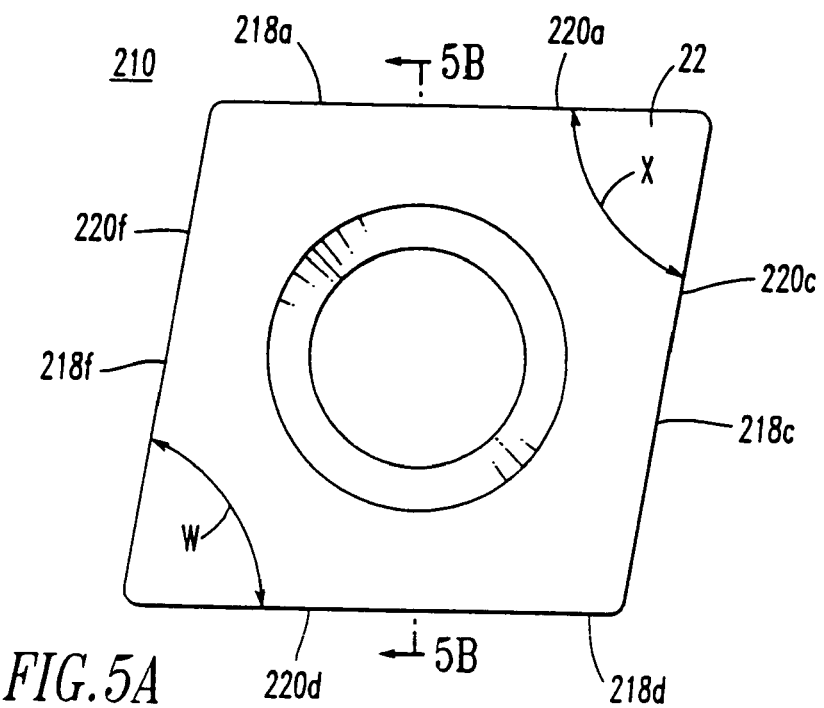
FIGS. 5A and 5B illustrate a top view, or plan view, and a section view along lines "5B—5B", respectively, of an 80° diamond cutting insert.
Figure 5B:
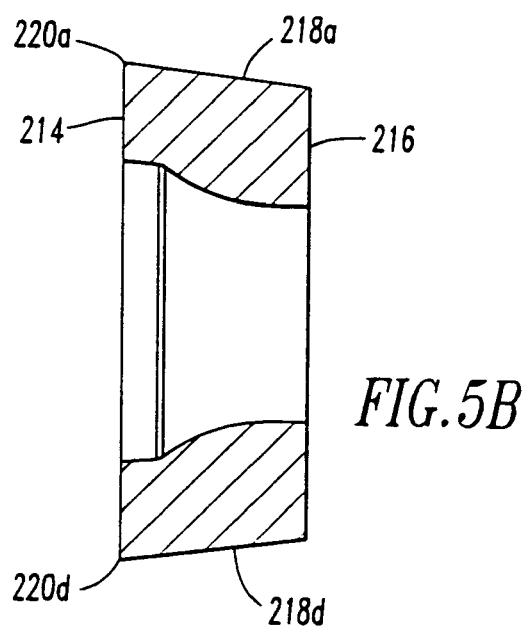

Directing attention to FIG. 5, a cutting insert 210 typically referred to as an 80° diamond, is illustrated. The insert 210 has a top surface 214 and a bottom surface 216.

This is a standard insert design, however, it should be noted that the core 22 associated with insert 10 and 110 has the general profile of the 80° diamond cutting insert 210 illustrated in FIG. 5. It is this profile of the 80° diamond cutting insert 210 which defines the shape of the core 22 for cutting insert 10 and cutting insert 110. The cutting insert 210 has four sides 218a, 218c, 218d and 218f with the top edges 220a, 220c, 220d and 220f defining core angles X and W. These core angles X and W are identical to the core angles associated with cutting inserts 10 and 110 previously defined. This is significant because it permits a toolholder having a pocket suitable to accept the 80° diamond cutting insert 210, with minor modifications, to also accept, among others, the 35° diamond insert 10, illustrated in FIG. 3A and the 55° diamond cutting insert 110 illustrated in FIG. 4A.

Figure 6:
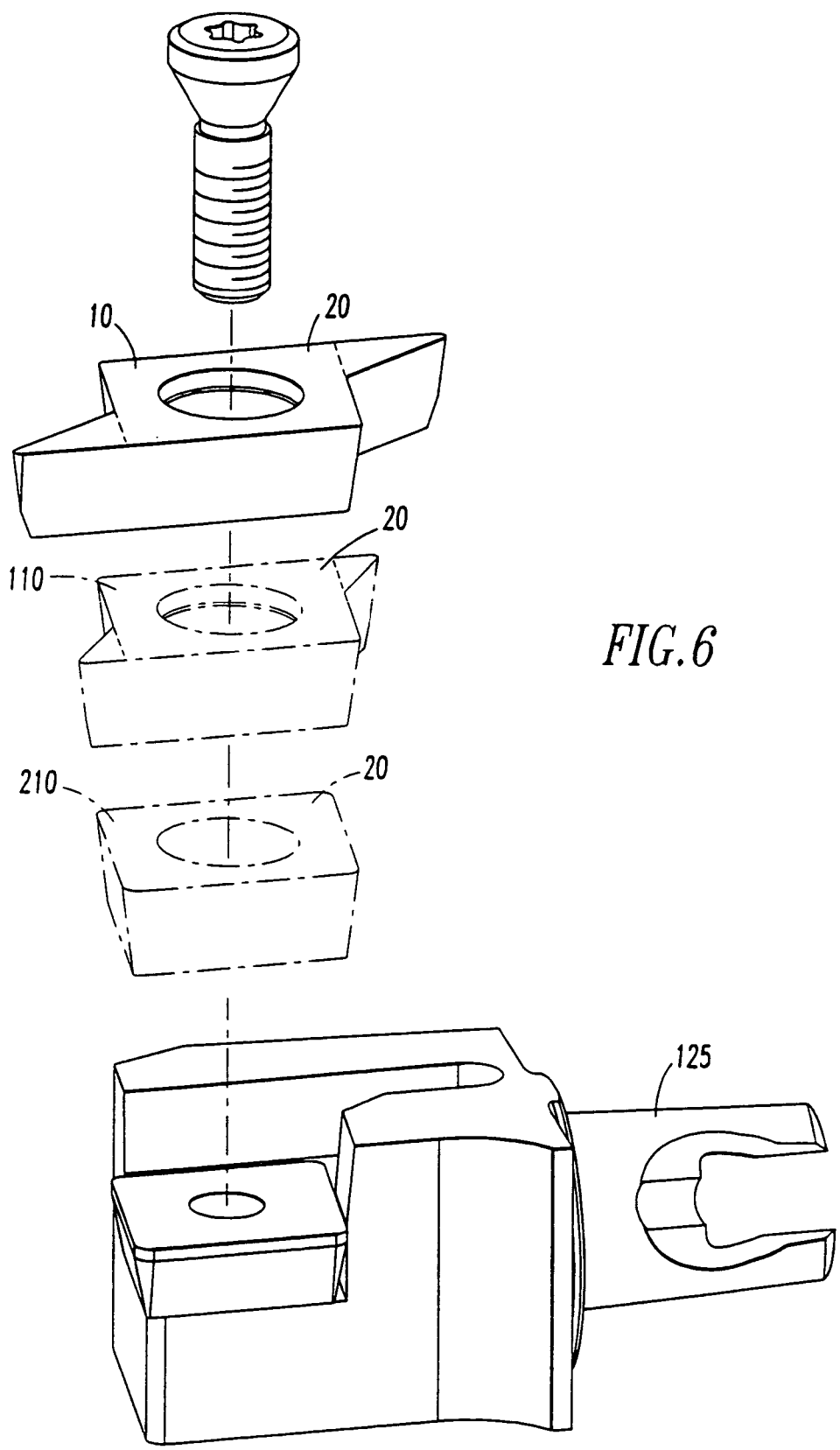
FIG. 6 illustrates an exploded perspective view of a toolholder with a number of inserts in phantom positioned such that it is easy to envision how these inserts would mount within the pocket of the toolholder.

The possibilities of a single toolholder 100 (FIG. 1) accepting a plurality of different cutting inserts having the same core 22 is illustrated in the exploded view of FIG. 6. The unique combination of the common core 22 with each of these inserts coupled with the unique features of the toolholder 100 will now be described to highlight the use of a single toolholder to accommodate a variety of different inserts each sharing a common core shape.

Directing attention to FIG. 2, a toolholder 100 is illustrated for supporting the cutting insert 10 having a core 22 with four sides 18a, 18c, 18d, 18e having a top edges 20a, 20c, 20d and 20e defining a quadrilateral shape. The core 22 has diametrically opposed corners 44, 46 with a pair of cutting portions 24, 26 having cutting tips 28, 34 extending from the two diametrically opposing corners 44, 46.

The toolholder 100 has a body 104 with a front end 106 and a pocket 102. The pocket 102 has a floor 108 and walls 112a, 112b, 112c, positioned rearwardly from the front end 106 of the body 104. The pocket 102 has a core region 113 which conforms with and provides support to the insert core 22. A shim 300, also shown in FIG. 1, provides support to the cutting insert 10. A shim 300 having a different thickness, may position the cutting insert 10 higher or lower in the pocket 102. The shim 300 in FIG. 2 is partially cut away to illustrate a shim bore 302.

Two walls 112a, 112c of the core region 113 are adapted to conform and provide support to two sides 18a, 18c of the core 22 of the cutting insert 10. The floor of pocket 108 in the core region 113 is adapted to conform and provide support to the insert core 22 whether such support is provided through the shim 300 on the floor 108 or through the cutting insert 10 resting directly upon the floor 108.

The pocket 102 further includes a recess 114 extending rearwardly from the core region 113. The recess 114 is of a sufficient area to encompass one cutting tip 28, for example, of the insert 10 when the insert 10 is mounted within the pocket 102. With cutting tip 34 extending from the toolholder 100. The recess 114 is generally intended to provide an area in which the unengaged cutting tip may rest and be afforded protection from the operating environment.

The core region 113 of the pocket 102 terminates at the front end 106 of the body 104 such tat when the insert 10 is positioned within the pocket 102, one cutting tip 34 extends beyond the floor of pocket 108 of the toolholder 100, while the other cutting tip 28 is encompassed by the pocket recess 114. The bore 47 of the pocket 102 may include threads 45 extending therein to accommodate threads 43 on retention pin 42 to secure the cutting insert 10 within the pocket 102.

The pocket recess 114 is of sufficient area to accommodate inserts having a tip angle less than 80° but greater or equal to 35°. In general, the pocket 102 is sized to fully support the largest insert for which the toolholder 100 is intended.

Figure 7A:
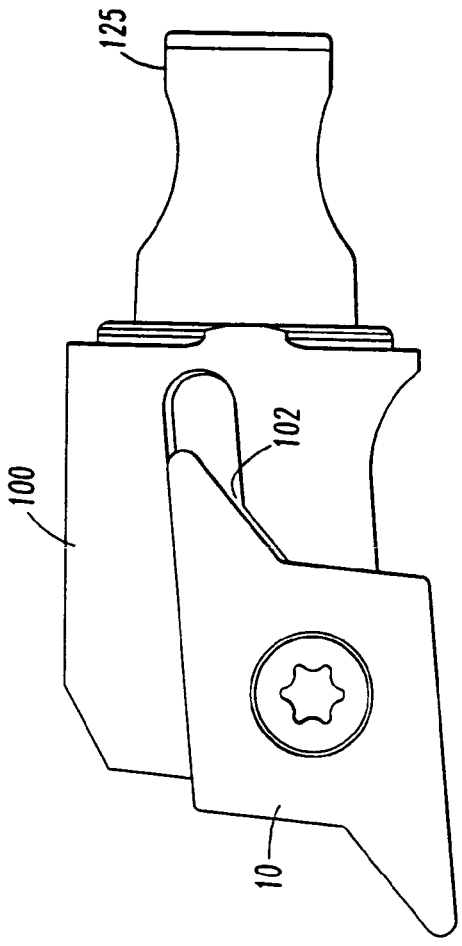
FIGS. 7A, B and C illustrate a top, side and end views of a toolholder having a cutting insert mounted therein.
Figure 7B:
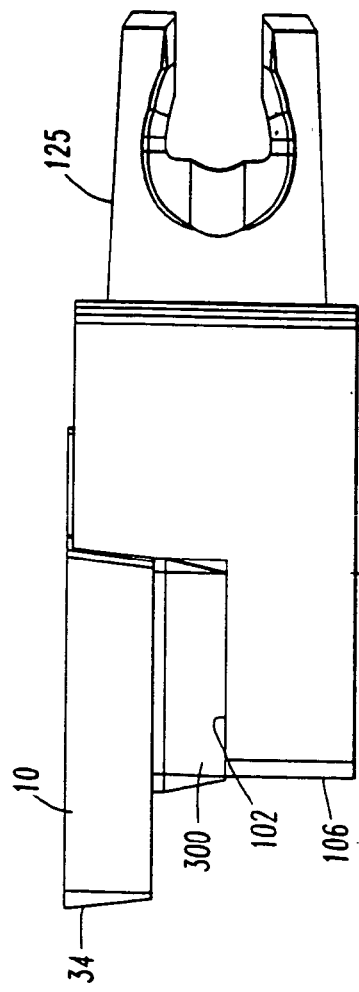
Figure 7C:
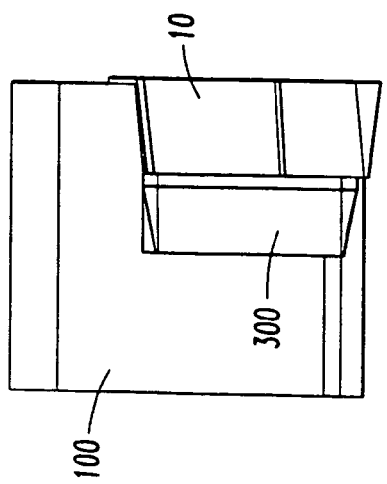

It is possible to provide a shim 300 and to conform the shape of the shim 300 to resemble the shape of the insert 10 it supports, thereby providing additional support to the tip 34 of the insert 10 that extends past the front end 106 of the toolholder 100. The appearance and details of such a shim would be known to those skilled in the art of cutting tool design. Additionally, it may be possible to remove the shim 300 entirely so that the insert 10 rests directly in the pocket 102. As an example, FIGS. 7A, B and C illustrate the toolholder 100 supporting a cutting insert 10, which is a 35° diamond insert. The cutting tip 34 of the insert 10, when mounted within the pocket 102 of the toolholder 100, is unsupported. Under certain circumstances, where the load upon the cutting insert 10 is low, such a configuration may be entirely acceptable. However, in the event it is desired to provide additional support to what essentially is a cantilevered cutting insert 10, it may be desirable to introduce the shim 300 within the pocket 102 of the toolholder 100, thereby providing additional support to the cutting tip 34 of the insert 10. It should be appreciated that while the shim 300 illustrated in FIG. 7 extends only partially beyond the front end 106 of the toolholder 100, it is entirely possible to include a shim 48 which extends further beyond the front end 106 of the toolholder 100, thereby providing additional support to the cutting tip 34 of cutting insert 10. In the alternative, when the cutting insert 10 will be subjected only to light loads, it may be entirely possible to position the insert 10 within the pocket 102 of the toolholder 100 without a shim or without any additional support beyond that already provided by the toolholder 100.

Figure 8:
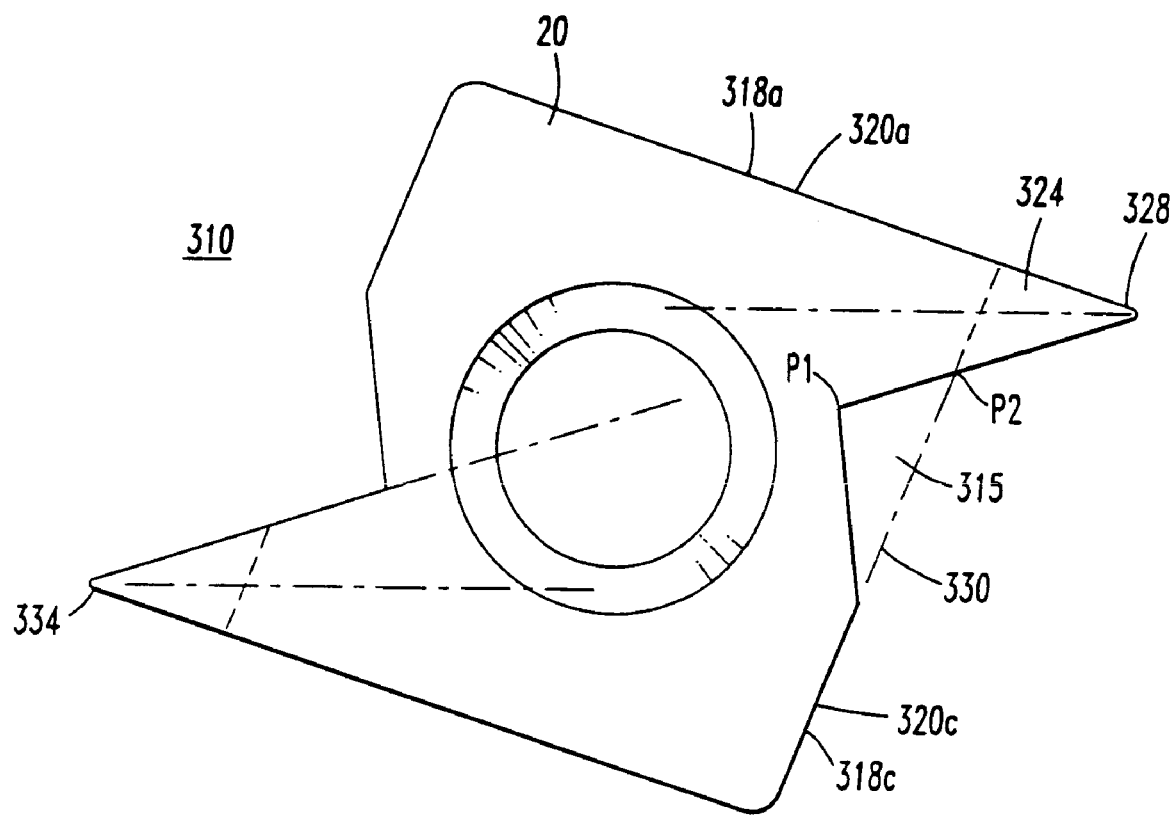
FIG. 8 illustrates a modified 35° diamond insert including a recess to further reduce the tip-to-tip length.

While the toolholder herein discussed may be used for any of a variety of applications, the toolholders illustrated, for example, in FIGS. 1 and 8 may have a back end 125 suitable for use with quick change tooling. In the alternative, it is entirely possible for the toolholder 100 to have a standard shank that is manually mounted within the toolholder 100 of a typical machine tool.

While the discussion so far has been directed to the cutting inserts 10, 110, 210 having a common core 22 which permits them to be mounted within a common toolholder 100, there is an additional benefit provided by the inserts in accordance with the subject invention. By introducing a core 22 having a core angle which is greater than the tip angle of the respective inserts, the tip-to-tip length of a standard cutting insert having only four sides defined by the pair of sides associated with each cutting tip may be reduced. In particular, and directing attention again to FIG. 3A, the introduction of the core 22 and the offset bisector lines 30, 36, reduces the overall tip-to-tip length of this 35° diamond cutting insert 10 by approximately 28 percent from the tip-to-tip length of a conventional 35° diamond insert having the same IC. In certain machining environments, and especially those in which space is at a premium, this reduction in tip-to-tip length provides more versatility to the machine operator and permits machining in areas that may be inaccessible to the full tip-to-tip length of the standard insert. This furthermore permits the use of a toolholder having a smaller pocket thereby allowing the toolholder to be smaller.

Directing attention to FIG. 8, it is possible to reduce this tip-to-tip length even further. In particular, the cutting insert 310 is similar to cutting insert 10 previously discussed, however, an indentation 315 is now introduced such that the top edge 320a of the side 318a of the first cutting portion 324 intersects with the core 22 at a point P1 recessed from a point P2 defined by the intersection of an extension 330 of the top edge 320c of the insert side 318c with the cutting portion 324. By doing so, the core 22 is still in tact, however, the tip-to-tip length between first cutting tip 328 and second cutting tip 334 of the insert 310 is still further reduced from even the tip-to-tip reduction illustrated in the 35° diamond insert of FIG. 3A.

Figure 9:
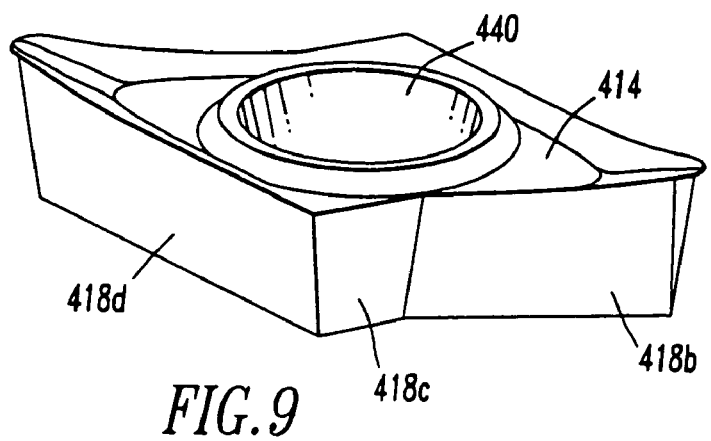
FIG. 9 is a perspective view of an alternate embodiment of a cutting insert in accordance with the subject invention.

It should be appreciated that the cutting inserts discussed so far have had flat top surfaces with a planar topography. The subject invention is directed to cutting inserts having both a planar topography and a non-planar topography. Directing attention to FIGS. 9, 10A and 10B, a cutting insert 410 has an insert body 412 with a top surface 414 and a bottom surface 416 defining sides 418a–418f therebetween.

Top edges 420a–420f are defined at the intersection of the top surface 414 with the sides 418a–418f. Bottom edges are defined at the intersection of the bottom surface 416 with the sides 418a–418f. Bottom edges 421a and 421d are shown in FIG. 10B.

The insert core 422 is made up of two pairs A, B of core sides, wherein one pair A is defined by the intersection of a first core side 418a and an extension of the second core side 418c and another pair B has a first core side 418d and a second core side 418f. The top edges 420a, 420c and 420d, 420f of each pair A, B of core sides 418a, 418c, 418d and 418f form core angles, as illustrated by angles W and X in FIG. 10A.

When viewed in plan, which is looking at the insert 410 directly down upon the top surface 414, the top edge 420a of the first core side 418a of one pair A of core sides is parallel to the top edge 420d of the first core side 418d of the other pair B of core sides. Furthermore, when viewed in plan, the top edge 420c of the second core side 418c of one pair A of core sides is parallel to the top edge 420f of the second core side 418f of the other pair B of core sides.

The cutting insert 410 has a first cutting portion 424 and a second cutting portion 426 each extending from the core 422.

Cutting portion 424 is comprised of a pair of sides 418a, 418b converging at a first tip angle Y to form a cutting tip 428. A bisector line 430 bisects the tip angle Y. The second cutting portion 426 has a pair of sides 418d, 418e whose top edges 420d, 420e converge at a second tip angle Z to form a cutting tip 434. A bisector line 436 bisects the second tip angle Z. When viewed in plan, the bisector line 430 of the first cutting portion 424 is offset by a distance d from and parallel to the bisector line 436 of the second cutting portion 426. Furthermore, each of the tip angles Y, Z is less than the respective core angles X, W adjacent to these tips 428, 434.

Figure 10A:
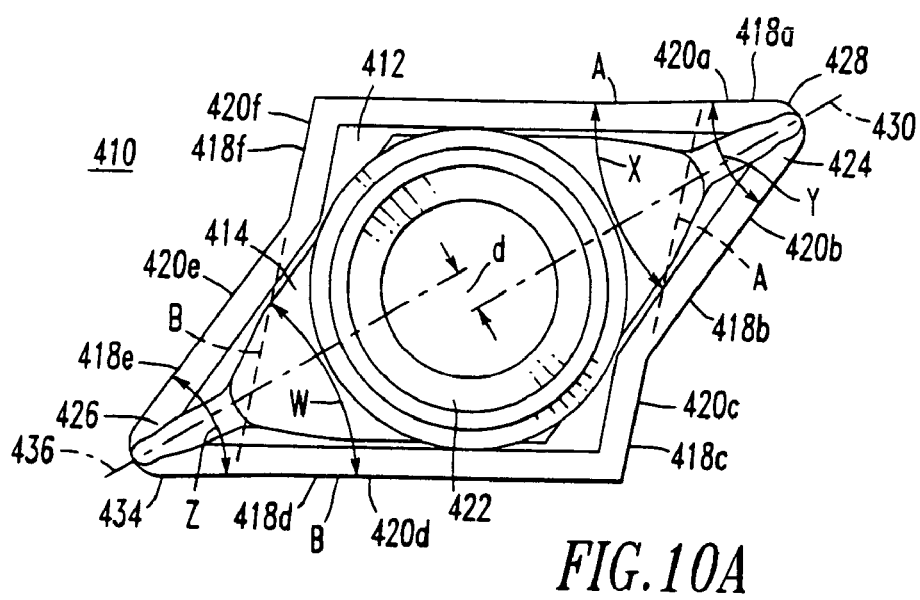
FIGS. 10A and 10B illustrate a top view, or plan view, and a side view of the cutting insert in FIG. 9.
Figure 10B:
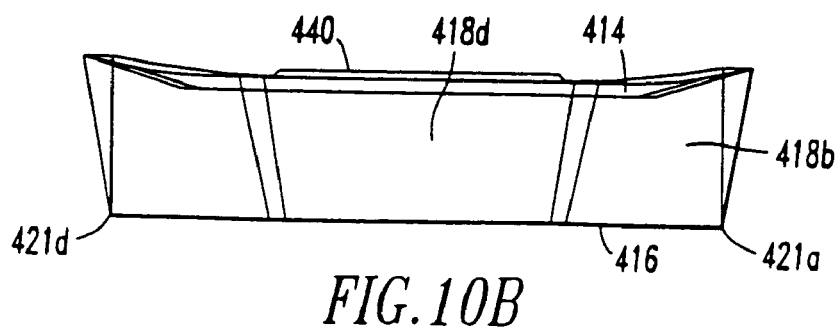

As illustrated in FIG. 10A, one side of the cutting tip 428 is common with the second core side 418a. Furthermore, as illustrated in FIG. 10A, the first tip angle Y is equal to the second tip angle Z. However, it should be noted that such a relationship is not necessary and it is entirely possible to have a first cutting portion 424 and a second cutting portion 426, each having different tip angles of between 5° and 85°. It should be noted that the cutting insert 410, illustrated in FIGS. 9 and 10A has a tip angle of 55°. Additionally, insert 410 has a bore 440 extending therethrough to accept a retention pin or screw for mounting the insert 410 within the pocket of a toolholder.

Finally, it should be appreciated that inserts in accordance with the subject invention may also be invertible and that the discussion directed to the cutting edges at the intersection of the top surface and sides, along with their geometric relationship, would be applicable to cutting edges formed at the intersection of the bottom surface and the sides.

The documents, patents and patent applications referred to herein are hereby incorporated by reference.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A cutting insert for metalworking operations comprised of an insert body having:
   a) a top surface and a bottom surface;
   b) sides between the top surface and the bottom surface, wherein the sides are comprised of core sides and tip sides;
   c) top edges at the intersection of the top surface with the sides;
   d) bottom edges at the intersection of the bottom surface with the sides;
   e) a core defined by two pairs of core sides, wherein each pair has a first core side and a second core side and wherein the top edges of each pair of core sides form a core angle with one another;
      1) wherein, in a plan view, the top edge of the first core side of one pair is parallel to the top edge of the first core side of the other pair;
      2) wherein, in a plan view, the top edge of the second core side of one pair is parallel to the top edge of the second core side of the other pair;
   f) a first cutting portion and a second cutting portion, each extending from the core, wherein each cutting portion is comprised of:
      1) a pair of tip sides having top edges converging at a tip angle to form a cutting tip; and
      2) a bisector line bisecting the tip angle;
   g) wherein, in a plan view, the bisector line of the first cutting portion is offset from and parallel to the bisector line of the second cutting portion, and
   h) wherein the tip angle is less than the core angle.

2. The cutting insert according to claim 1, wherein one tip side of each cutting tip is common with the second core side of each pair of core sides.

3. The cutting insert according to claim 1, wherein the tip angle is between 15° and 85°.

4. The cutting insert according to claim 3, wherein each tip angle is 35°.

5. The cutting insert according to claim 4, wherein each tip angle is 55°.

6. The cutting insert according to claim 1, wherein the first tip angle is equal to the second tip angle.

7. The cutting insert according to claim 1, wherein the first tip angle is not equal to the second tip angle.

8. The cutting insert according to claim 1, wherein each cutting portion intersects with the core at a point recessed from a point defined by the intersection of an extension of the core side each with the cutting portion.

9. The cutting insert according to claim 1, wherein the insert is indexable.

10. The cutting insert according to claim 1, further including a bore extending between the top surface and the bottom surface to accept a retention pin for retaining the insert within a pocket of a toolholder.

11. The cutting insert according to claim 1, wherein the top and bottom surfaces of the body have surfaces to accept a clamp for holding the insert within a pocket of a toolholder.

12. A toolholder assembly comprised of:
   I) a cutting insert with of an insert body having:
      a) a top surface and a bottom surface;
      b) sides between the top surface and the bottom surface, wherein the sides are comprised of core sides and tip sides;
      c) top edges at the intersection of the top surface with the sides;
      d) bottom edges at the intersection of the bottom surface with the sides;
      e) a core defined by two pairs of core sides, wherein each pair has a first core side and a second core side and wherein the top edge of each pair of core sides forms a core angle with one another;
         1) wherein, in a plan view, the top edge of the first core side of one pair is parallel to top edge of the first core side of the other pair;
         2) wherein, in a plan view, the top edge of the second core side of one pair is parallel to top edge of the second core side of the other pair;
      f) a first cutting portion and a second cutting portion, each extending from the core, wherein each cutting portion is comprised of:
         1) a pair of tip sides having top edges converging at a tip angle to form a cutting tip; and
         2) a bisector line bisecting the tip angle;
      g) wherein, in a plan view, the bisector lines of the first cutting portion is offset from and parallel to the bisector line of the second cutting portion, and
      h) wherein the tip angle is less than the core angle; and
   II) a toolholder for supporting the cutting insert, wherein the toolholder is comprised of:
      a) a body having a front end;
      b) a pocket with a floor and walls extending rearwardly from the front end of the body, wherein the pocket has a core region that conforms to and provides support to the insert core;
c) wherein two walls in the core region conform to and provide support to two sides of the insert core;
d) wherein the floor in the core region is conform to and provide support to the insert core;
e) wherein the pocket further includes a recess extending rearwardly from the core region and of sufficient area to encompass one cutting tip of the insert when the insert is mounted within the pocket;
f) wherein the core region of the pocket terminates at the front end of the body such that, with the insert positioned within the pocket, one cutting tip extends beyond the front end of the toolholder while the other cutting tip is encompassed by the pocket recess.

13. The toolholder assembly according to claim 12, wherein the pocket recess accommodates inserts ranging from an 85° diamond to a 35° diamond.

14. The toolholder assembly according to claim 12, wherein the pocket is sized to fully support the smallest insert that will fit within the pocket.

15. The toolholder assembly according to claim 14, further including a shim associated with each insert larger than the smallest insert that is mounted within the pocket of the toolholder.

* * * * *